United States Patent [19]
Ikutake

[11] Patent Number: 4,499,643
[45] Date of Patent: Feb. 19, 1985

[54] PROCESS FOR MANUFACTURING A PISTON RING

[75] Inventor: Hiroshi Ikutake, Saitama, Japan

[73] Assignee: Nippon Piston Ring Co., Ltd., Tokyo, Japan

[21] Appl. No.: 510,119

[22] Filed: Jul. 1, 1983

[30] Foreign Application Priority Data

Jul. 1, 1982 [JP] Japan ................. 57-112592

[51] Int. Cl.³ ............................................. B23P 15/08
[52] U.S. Cl. ................ 29/156.6; 29/156.5 R;
29/412; 29/DIG. 4; 29/DIG. 24; 29/DIG. 48;
219/121 ED; 219/121 EG; 219/121 PB;
219/121 PK; 219/121 LD; 219/121 LF;
228/219; 228/220; 228/242; 228/245; 277/236
[58] Field of Search ............ 29/156.6, 156.61, 156.62,
29/156.63, 156.5 R, DIG. 4, DIG. 24, DIG. 48,
412; 219/121 ED, 121 EG, 121 PB, 121 PK,
121 LD, 121 LF; 228/219, 220, 228, 229, 242,
244, 245, 256; 277/236

[56] References Cited

U.S. PATENT DOCUMENTS

| | | | |
|---|---|---|---|
| 684,617 | 10/1901 | Rathbun | 29/156.6 |
| 1,538,107 | 5/1925 | Giller | 29/156.6 |
| 1,680,369 | 8/1928 | Dugan | 29/156.6 X |
| 2,036,801 | 4/1936 | Fitzgerald | 29/156.6 |
| 2,119,035 | 5/1938 | Ballard | 29/156.6 |
| 2,190,125 | 2/1940 | Sembdner | 29/156.6 X |
| 2,654,977 | 10/1953 | Squibb et al. | 29/156.6 X |
| 2,787,046 | 4/1957 | Wagstaff | 228/219 X |
| 3,000,080 | 9/1961 | Ronay | 29/156.6 |
| 3,095,500 | 6/1963 | Jost | 228/231 X |
| 3,353,247 | 11/1967 | Kubera | 29/156.6 |
| 3,417,223 | 12/1968 | Steigerwald | 219/121 ED X |
| 3,608,347 | 9/1971 | Kemminer | 29/156.6 X |
| 3,805,352 | 4/1974 | De Montremy | 29/156.6 |
| 3,912,152 | 10/1975 | Forand, Jr. | 228/219 X |
| 3,974,016 | 8/1976 | Bondybey et al. | 219/121 LD X |
| 3,997,099 | 12/1976 | Morisaki | 228/231 X |
| 4,048,459 | 9/1977 | Earle | 219/121 LD X |
| 4,185,185 | 1/1980 | Adlam | 219/121 LD X |
| 4,187,408 | 2/1980 | Heile | 219/121 LD X |

Primary Examiner—Charlie T. Moon
Assistant Examiner—Ronald S. Wallace
Attorney, Agent, or Firm—Sughrue, Mion, Zinn, Macpeak & Seas

[57] ABSTRACT

A process for manufacturing a piston ring is disclosed wherein web-like first metal member which will form a base of a piston ring and web-like second metal member which will form a wear resistant layer of the piston ring are separately fed and joined together. The joined web is subject to curving to gradually decrease a radius of curvature.

5 Claims, 5 Drawing Figures

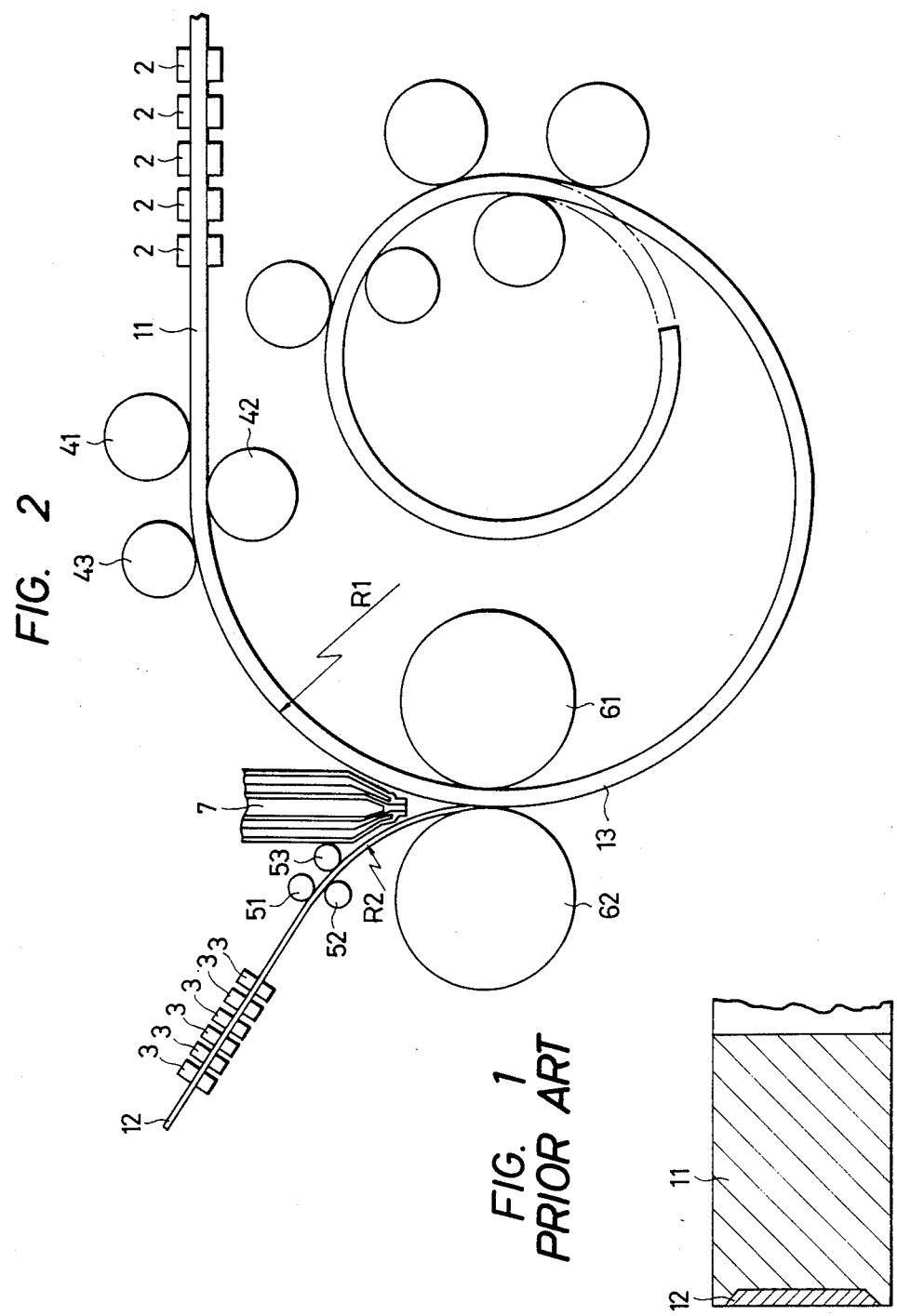

PROCESS FOR MANUFACTURING A PISTON RING

BACKGROUND OF THE INVENTION

This invention relates to a process for manufacturing a piston ring for an internal combustion engine, particularly a piston ring having a wear-resistant layer on its outer peripheral surface.

A piston ring is required to be wear resistant particularly in its outer peripheral surface defining a sliding surface contacting a cylinder liner. It is, therefore, usual to provide a wear-resistant layer 12 on a base piston ring material 11, as shown in FIG. 1. This layer is usually formed by surface coating, which is realized by chromium plating or spray coating of molybdenum, a ferroalloy, ceramics or the like, or heat treatment for hardening, such as soft or ionic bitriding, surface remelting or surface layer melting and alloying. The layer formed by surface coating is, however, not satisfactorily bonded to the base material, but easily peels or breaks. The heat treatment for hardening is low in productivity, since a long time is required, or since some methods, such as surface melting, render the surface so rough as to require posttreatment, though the heat treatment itself may be carried out in a short time.

There are piston rings in which a different material is embedded, for example, a ferrox insert, or a soft metal such as copper or lead. These piston rings are manufactured by filling a groove in a base piston ring material with powder of any such different material, or a paste obtained by kneading it with a binder, and baking the whole. Alternatively, a sheet or ribbon of wire rod material may be press fitted or upset in a piston ring groove.

The material which can be embedded in these piston rings is, however, limited to a soft material which easily undergoes plastic deformation, or a material which can be baked at a low temperature. These materials are primarily employed to improve the draping and lubricating properties of piston rings, and not expected to be resistant to wear.

Accordingly, it is impossible to embed a wire rod of hard material, such as martensitic high-chromium stainless steel, since its difficulty in plastic deformation disables press fitting or upsetting in a piston ring groove, and moreover, since no baking or other method is possible for fixing it to the piston ring.

SUMMARY OF THE INVENTION

It is an object of this invention to provide a process for manufacturing a piston ring of the type to which a hard material is joined, and which is excellent in productivity and performance.

This invention resides essentially in a process for the manufacture of a piston ring which consists of the following seven features as recited in the claims:

(1) Preparing a base piston ring material in the form of a wire rod and a second member in the form of a wire rod;

(2) (First step) Feeding said base material and said second member from different directions;

(3) (Second step) Melting by heat those portions of said base material and said second member at which they are joined;

(4) (Third step) Bringing said base material and said second member into intimate contact with each other to form a piston ring stock;

(5) (Fourth step) Bending said stock into a ring with a predetermined radius of curvature;

(6) (Fifth step) Cutting said stock to form a split in said ring; and (7) (Sixth step) Heat treating said ring.

BRIEF DESCRIPTION OF THE DRAWINGS

FIG. 1 is a cross sectional view of a conventional piston ring;

FIG. 2 is a schematic view illustrating the process of this invention; and

DETAILED DESCRIPTION OF THE PREFEERED EMBODIMENTS

Figure 3:
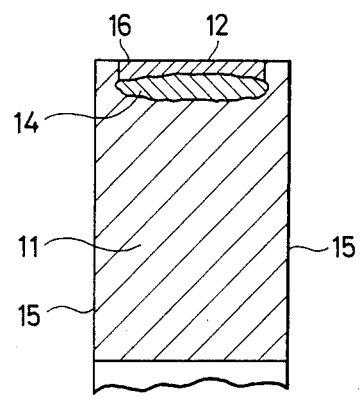
FIGS. 3 to 5 are cross sectional views showing other embodiments of this invention.

The process of this invention will now be described by way of example.

The process of this invention is schematically shown in FIG. 2. A base piston ring material 11 and a second member 12 are fed toward each other from different directions by rollers 2 and 3, respectively. The base material 11 is preliminarily bent with a large radius $R_1$ of curvature by primary bending rollers 41, 42 and 43. Likewise, the second member 12 is bent with a predetermined radius $R_2$ of curvature by primary bending rollers 51, 52 and 53. The directions in which they are fed, and their radius of primary bending depend on the positions of rollers 61 and 62 between which they are intimately joined.

A heater 7 is provided for heating those portions of the base material 11 and the second member 12 at which they join each other. The heater supplies an arc or heating beam to remelt the surface layers of the base material 11 and the second member. The base material 11 and the second member 12 are, then, brought into intimate contact with each other, and simultaneously cooled, whereby they are welded to form a piston ring stock 13.

The stock 13 is bent into a ring having the final radius of curvature by three or five rollers 81, 82, 83, 84 and 85 which are usually used for curling a steel piston ring. The ring is cut to form a split, and heat treated.

The piston ring may be formed in the shape of a true circle by five rollers as shown in FIG. 2, or in the shape of a cam, or in any other predetermined shape by winding on a circular or cam-shaped jig. A split may be cut for each piston ring, or alternatively, after a coil of piston rings has been formed.

The heat treatment is performed for removing any internal strain created in the piston ring by plastic deformation, and the thermal strain created when the base material and the second member are welded together. If ordinary heat treatment, such as hardening or soft nitriding, is done, however, no special heat treatment for strain removal is required, since the internal stress and strain created by welding and plastic deformation can be removed by such ordinary heat treatment.

In order to heat the base material and the second member for welding, it is appropriate to employ a source of heat providing a high heat energy density, such as a plasma arc or laser beam, since it is necessary to ensure that only the joining surfaces of the base material and the second member be selectively melted, or that as far as at least the base material is concerned, only its surface be melted. Moreover, it is necessary to remelt those surfaces in a reducing or nonoxidizing atmosphere to prevent their oxidation. Therefore, such remelting may be effected in an inert gas or plasma arc.

It is advisable to feed the second member at a higher speed than the base material in order to reduce any internal stress created in the joint between the base material and the second member when the piston ring stock is finally bent, thereby avoiding any cracking or fracture of the welded joint.

The preliminary bending of the base material and the second member is intended for reducing the internal stress which is created in the welded joint when the stock is finally bent, and for establishing an angle at which the base material 11 and the second member 12 are required to meet immediately ahead of the welding rollers 61 and 62.

While a first embodiment of the process according to this invention has been described, this invention can also can carried out as will hereinafter be described to provide piston rings.

Figure 4:
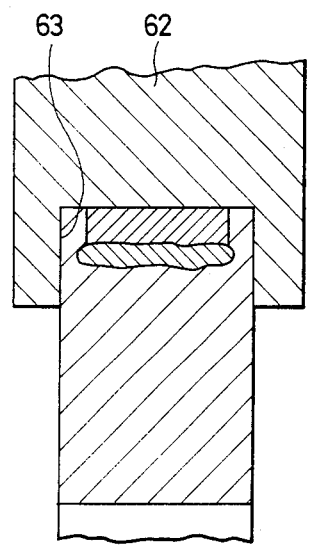

The second member 12 is joined to the base material 11, and a welding bead 14 is formed therebetween, as shown in FIG. 3. If any such bead 14 exists on the upper and lower surfaces of the piston ring, their machinability is greatly lowered, and it is impossible to obtain any accurately finished surface. Therefore, the piston ring material 11 has a groove 16 in which the second member 12 is fitted. If the heater fails to heat only the joining surfaces of the base material and the second member, the bead 14 extends to the outer surface of the piston ring. Therefore, the welding roller 62 has a groove 63 surrounding the edge of the piston ring as shown in FIG. 4, and is provided with a forced cooling means in its interior, so that the arc or beam created by the heater may be flattened. For such flattening purposes, it is possible to employ a magnetic field for controlling a plasma arc, or a semicylindrical mirror in case a laser beam is used, or control the direction in which a beam is oscillated if an electron beam is used.

As the base material and the second member differ greatly in volume, they also differ greatly in heat capacity; therefore, it is possible that when they are heated, the second member may be melted in its entirety. Even if such is the case, however, the welding roller 62 rolls the surface of the second member defining the outer peripheral surface of the piston ring so that the piston ring may not have any rough outer peripheral surface.

Figure 5:
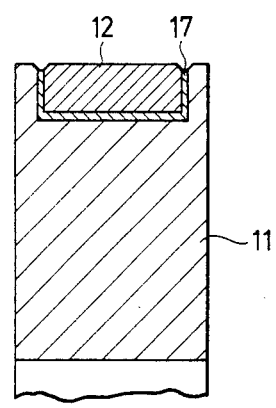

The base material 11 and the second member 12 can also be joined to each other by brazing, as shown in FIG. 5. A brazing agent 17 is applied or coated in a line on the base material 11 or the second member while they are still in the form of a straight rod, and heated to a temperature which is equal to, or higher than its melting point, but lower than the melting points of the base material and the second member. This method eliminates the possibility of any welding bead being exposed to the outer surface of the piston ring, or of the second member being totally melted.

According to this invention, it is preferable to use high carbon steel or low alloy high carbon steel for the base material, and a material of high hardness and wear resistance, such as high carbon martensitic stainless steel or high speed tool steel, for the second member.

As is obvious from the foregoing description, this invention enables the continuous mass production of piston rings composed of different materials, a high degree of joint strength between the different materials by welding or brazing, and a smooth piston ring surface which facilitates any possible posttreatment. It provides a highly productive process for manufacturing piston rings.

What is claimed is:

1. In a process for manufacturing a piston ring by forming a piston ring material in the shape of a wire rod into a ring by plastic deformation with a predetermined radius of curvature, and applying a different material to the outer periphery of said piston ring material, the improvement which comprises:
   the first step of preparing a base piston ring material in the form of a wire rod and a second member in the form of a wire rod, and then feeding said base material and said second member from different directions;
   the second step of melting by heat those portions of said base material and said second member which are to be joined;
   the third step of bringing said base material and said second member into intimate contact with each other and bonding to form a composite piston ring stock;
   the fourth step of bending said stock into a helix with a predetermined radius of curvature and with said second member positioned on the outer peripheral surface of said helix;
   the fifth stop of severing said helix to form a split piston ring having spaced ends; and
   the sixth step of heat treating said piston ring.

2. A process for manufacturing a piston ring as set forth in claim 1, further including preliminarily bending said base material and said second member with a predetermined radius of curvature before they are fed to rollers by which they are brought into intimate contact with each other.

3. A process for manufacturing a piston ring as set forth in claim 1, wherein said melting by heat is carried out in a nonoxidizing atmosphere.

4. A process for manufacturing a piston ring as set forth in claim 1, wherein said base material has a groove in which said second member is fitted to be thereby joined to said base material.

5. A process for manufacturing a piston ring as set forth in claim 1, wherein a brazing agent is disposed between said base material and said second member, and melted by heat to join said base material and said second member.

* * * * *